G. E. Donisthorpe,
Mining Coal.

N° 81,760.   Patented Sep. 1, 1868.

Witnesses
W. H. Cowley
Thos. Trusdale

Inventor
G. E. Donisthorpe

United States Patent Office.

GEORGE EDMUND DONISTHORPE, OF LEEDS, ENGLAND.

Letters Patent No. 81,760, dated September 1, 1868; patented in England, May 22, 1861.

IMPROVED COAL-MINING APPARATUS.

*The Schedule referred to in these Letters Patent and making part of the same.*

TO ALL TO WHOM IT MAY CONCERN:

Be it known that I, GEORGE EDMUND DONISTHORPE, of Leeds, England, a subject of the Queen of Great Britain, have invented or discovered new and useful "Improvements in Apparatus Used in Getting Coal;" and I, the said GEORGE EDMUND DONISTHORPE, do hereby declare the nature of the said invention, and in what manner the same is to be performed, to be particularly described and ascertained in and by the following statement thereof; that is to say—

This invention has for its object improvements in apparatus used in getting coal. Heretofore, when getting coal, it has been usual in many cases to cut a groove horizontally along the face which is being worked, so as to undercut the coal, and it has also been the practice to cut vertical or upright grooves from the horizontal groove or cutting before mentioned to the desired height, and such horizontal and upright grooves or cuttings have been made to a considerable extent or depth into the coal. The coal has been detached in some cases by driving in wedges, so as to separate the quantity of coal which is undercut horizontally, and divided by the upright grooves or cuttings, and other means of detaching the coal, such as blasting, have also been resorted to. The cutting of the horizontal groove or cutting has heretofore usually been accomplished by manual labor, by the use of hand-picks, as is well understood.

Now, my invention consists in employing for this purpose a bar or tool, which is mounted on a carriage provided with wheels, which run on and are guided by trams or rails laid down parallel, or nearly so, with the face of the coal which is being worked, the bar or tool being so mounted on the carriage that it may with facility be moved to and fro by the workman or miner.

By moving the carriage progressively along the rail or tramway, whilst at the same time a reciprocating to-and-fro motion is imparted to the cutting-tool to cause it to move to and from the coal, a groove will be produced which will be deepened or extended horizontally into the coal by another or other cutting-bar or bars, to which a similar to-and-fro reciprocating motion is imparted, and then the coal may be separated as heretofore.

Having thus stated the nature of my invention, I will proceed more fully to describe the manner of performing the same.

Figure 1:
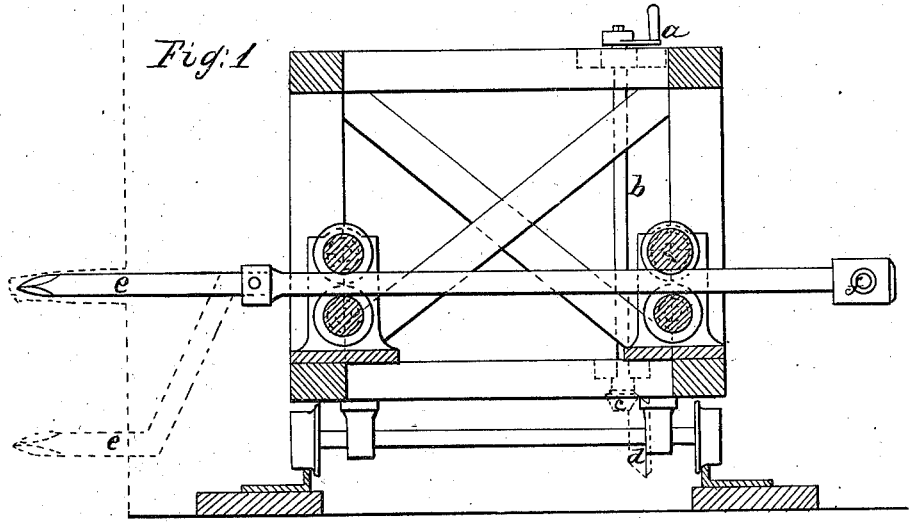
Figure 1 shows a sectional elevation.
Figure 2:
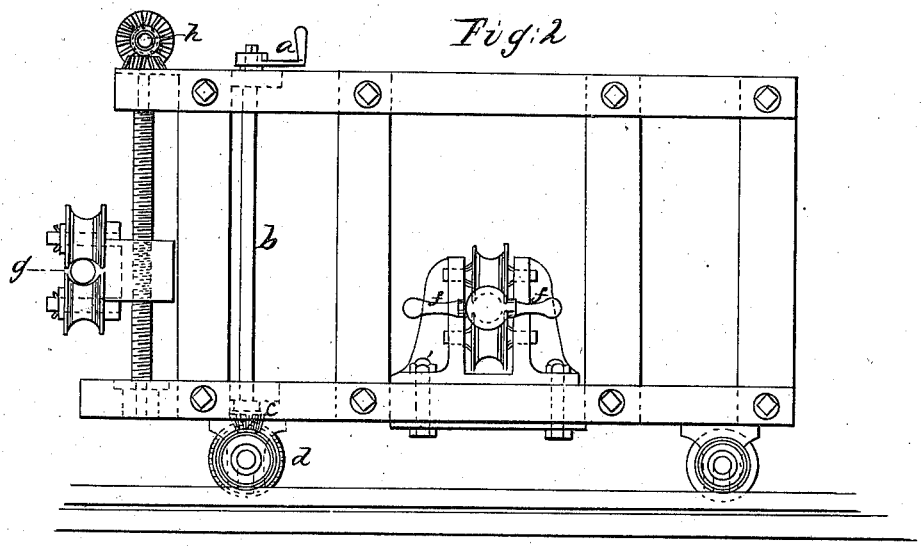
Figure 2 a side elevation of a carriage suitably arranged to run on a tram or railway, and fitted with picks capable of being slid or moved to and from the face of the work as the carriage is progressively moved along.

In the arrangement shown in the drawings the carriage is caused to move by means of the handle $a$, which gives motion to the axis $b$, on which is fixed the bevelled-toothed wheel $c$, which gears into the bevelled-toothed wheel $d$ on the axis of one pair of the running-wheels of the carriage. $e\ e$ are picks or tools, which may be straight or cranked. The bars or rods which carry these picks are supported by and move between grooved pulleys, which guide the picks or tools to their work, but such bars or rods may be supported in other bearings so long as they can be readily slid to and fro and guided to their work. The end of the rod or bar has handles $ff$ fixed thereto, by which the workman can force the pick or tool with great force against the face of the work, so as to produce a horizontal groove to any desired depth, or other means than handles may be employed to enable the workman to give a reciprocating to-and-fro motion to the cutter-bar. In order to make vertical cuts or grooves, there is another tool or pick, $g$, carried by a similar bar or rod, with handles at the end, and capable of being moved quickly to and fro. In addition thereto the bearings of the bar or rod (whether grooved pulleys be used, as shown in the drawings, or bearings of other form be employed) are made capable of being raised or lowered by means of two screws, one at each side of the carriage, but geared together by a horizontal shaft, $h$, and bevelled wheels, as shown.

When a horizontal groove has been formed to a certain depth into the coal by the cutting-tool of an apparatus such as above described, the groove is afterwards deepened by another cutting-tool carried by a similar apparatus until the groove is brought to the depth desired; or, in place of this, the cutting-tool which is to deepen the groove, might be on the same carriage as the first cutting-tool.

The carriage, thus combined with the tool or tools, relieves the workman of the care and exertion required to guide and support the tool, and permits him to exert his whole force in impelling the tool against the rock or coal. The machine thus becomes an important assistant to hand-mining, and enables an ordinary laborer to do a larger amount of work than a skilful miner can with the ordinary mining-tools, supported and guided by hand.

I am aware that tools connected with engines have been supported and guided upon carriages, but in this case the power that impels the tool is applied by the engine, and such mining-machinery can be used only in cases where compressed air or steam can be procured. They also require the employment of costly apparatus to furnish the steam or compressed air.

My invention is adapted to manual labor, and although I do not confine myself to the precise arrangement of apparatus herein described,

What I claim is—

The combining with a carriage (capable of being moved by mechanism slowly along the face of the coal or mineral) a cutting-tool, which is so supported and guided that a reciprocating to-and-fro motion may be imparted to it by the power of the workman, substantially as herein described.

G. E. DONISTHORPE.

Witnesses:
W. H. COWLEY,
THOS. GRISDALE, Jr.,
} Both of Leeds, England.